United States Patent [19]
Scaramucci

[11] Patent Number: 5,236,007
[45] Date of Patent: Aug. 17, 1993

[54] TOP-ENTRY CHECK VALVE HAVING RETAINER RING

[76] Inventor: John P. Scaramucci, 10724 Woofridden, Oklahoma City, Okla. 73170

[21] Appl. No.: 824

[22] Filed: Jan. 4, 1993

Related U.S. Application Data

[63] Continuation of Ser. No. 762,104, Sep. 18, 1991, abandoned.

[51] Int. Cl.⁵ .............................................. F16K 15/03
[52] U.S. Cl. ................................ 137/454.2; 137/454.6; 137/527.2; 137/527.4; 137/527.8
[58] Field of Search .............. 137/454.2, 454.4, 454.6, 137/527, 527.2, 527.4, 315, 327, 328

[56] References Cited

U.S. PATENT DOCUMENTS

| | | | |
|---|---|---|---|
| 485,745 | 11/1992 | Loveland . | |
| 556,636 | 3/1996 | Kuichling . | |
| 846,317 | 3/1907 | Kiddle | 137/527.4 |
| 1,399,684 | 12/1921 | Belcher | 137/527 |
| 1,647,036 | 10/1927 | Dileo . | |
| 1,827,913 | 10/1931 | Rymal . | |
| 2,048,088 | 7/1936 | Wagner . | |
| 2,282,532 | 5/1942 | Shenk . | |
| 2,664,264 | 12/1953 | Fennema | 137/454.2 X |
| 2,844,164 | 7/1958 | Robbins | 137/454.6 |
| 2,918,934 | 12/1959 | Wheatley | 137/527.2 |
| 2,923,317 | 2/1960 | McInerney | 137/527.2 |
| 2,928,416 | 3/1960 | Balhouse | 137/527.8 |
| 3,075,547 | 1/1963 | Scaramucci | 137/516.2 |
| 3,119,594 | 1/1964 | Heggem | 251/228 |
| 3,295,550 | 1/1967 | Scaramucci | 137/527.4 |
| 3,394,731 | 7/1968 | Elliott | 137/527.8 |
| 3,817,277 | 6/1974 | Wheatley | 137/515.7 |
| 3,933,173 | 1/1976 | Kajita | 137/527.8 |
| 3,934,608 | 1/1976 | Guyton | 137/527.8 |
| 3,996,962 | 12/1976 | Sutherland | 137/527.4 X |
| 4,176,681 | 12/1979 | Mackal | 137/541 |
| 4,223,697 | 9/1980 | Pendleton | 137/527.8 |
| 4,230,150 | 10/1980 | Scaramucci | 137/527 |
| 4,252,144 | 2/1981 | Scaramucci | 137/454.6 |
| 4,257,444 | 3/1981 | Ogle | 137/454.2 X |
| 4,284,097 | 8/1981 | Becker | 137/454.2 X |
| 4,508,139 | 4/1985 | Teumer | 137/315 |

FOREIGN PATENT DOCUMENTS

1806409 9/1969 Fed. Rep. of Germany .
44-12462 6/1969 Japan .

Primary Examiner—Robert G. Nilson
Attorney, Agent, or Firm—Dunlap, Codding & Lee

[57] ABSTRACT

A top-entry check valve having a seat, cage, disc and removable bonnet utilizes a retainer ring to prevent movement of the seat, cage and disc in the downstream direction. An annular shoulder in the valve body prevents movement of the seat, cage and disc in the upstream direction. The disc has a hinge pin which is cradled in hinge pin supports of the cage to hold the disc in place. The retainer ring is secured in the valve body by fitting into a transverse groove formed in the inside surface of the valve body. Removal of the bonnet allows access to the valve chamber for replacement of the seat, cage, disc or retainer ring.

24 Claims, 8 Drawing Sheets

TOP-ENTRY CHECK VALVE HAVING RETAINER RING

This is a continuation of copending application Ser. No. 07/762,104, filed on Sep. 18, 1991, now abandoned.

CROSS REFERENCE TO RELATED APPLICATIONS

This application is related to the following applications filed on an even date herewith:

Top-Entry Check Valve With Threaded Fasteners, Ser. No. 762,540, filed Sep. 18, 1991, now U.S. Pat. No. 5,161,570.

Top-Entry Check Valve With Screw-In Seat, Ser. No. 762,514, filed Sep. 18, 1991, now U.S. Pat. No. 5,161,566.

Top-Entry Check Valve Having Spring Retainer, Ser. No. 762,517, filed Sep. 18, 1991, now U.S. Pat. No. 5,156,183.

Top-Entry Check Valve With Cartridge Secured By Projections, Ser. No. 761,594, filed Sep. 18, 1991, now U.S. Pat. No. 5,143,113.

Top-Entry Check Valve With Cartridge Secured By Threaded Projections, Ser. No. 762,811, filed Sep. 18, 1991, now U.S. Pat. No. 5,143,112.

Top-Entry Check Valve With Pin Fasteners, Ser. No. 762,539, filed Sep. 18, 1991, now U.S. Pat. No. 5,156,182.

FIELD OF THE INVENTION

This invention relates to improvements in top-entry swing check valves.

SUMMARY OF THE INVENTION

The present invention provides a top-entry check valve with a smooth, straight chamber which minimizes both turbulence and pressure drop of the fluid passing through the valve. The relatively small cavity of this design allows an overall reduction in size and weight over conventional top-entry check valves.

The cartridge assembly of the valve includes a seat, a cage and a disc. The seat and cage may be a unitary structure in order to make replacement of the seat and cage more easily accomplished.

A removable bonnet is attached over the access opening to the valve chamber. With the bonnet detached, the seat, cage and disc can readily be replaced.

An annular shoulder in the valve chamber prevents the valve cartridge from moving in an upstream direction. A transverse groove in the valve chamber and a retainer ring hold the valve cartridge against movement in an downstream direction.

Additional advantages and features will become apparent from the detailed description of the preferred embodiments of the invention when read in conjunction with the drawings and appended claims.

BRIEF DESCRIPTION OF THE DRAWINGS

FIG. I is a vertical cross-sectional view of a prior art top-entry check valve with turbulent flow.

DETAILED DESCRIPTION OF THE PREFERRED EMBODIMENTS

Figure 1:
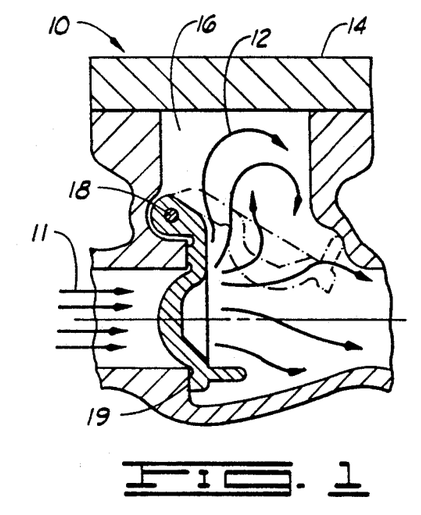

Referring now to the drawings in detail, and to FIG. 1 in particular, the reference numeral 10 generally designates a prior art top-entry check valve. Flow into the valve 10 is indicated by the straight arrows 11. As illustrated by the swirling arrows 12, turbulent flow is created by the high bonnet 14 and large cavity 16. This construction requires machining inside the valve body for the hinge 18 and valve seat 19.

Figure 2:
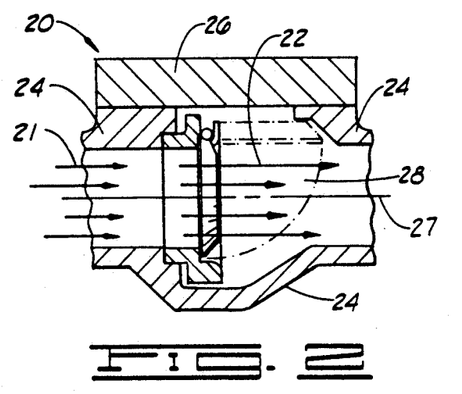
FIG. 2 is a vertical cross-sectional view of a top-entry check valve constructed in accordance with the present invention and illustrating the smooth flow through the valve chamber.

FIG. 2 illustrates a typical top-entry check valve 20 constructed in accordance with the present invention. Flow into the valve 20 is designated by the straight arrows 21. The arrows 22 illustrate the smooth, even flow through valve 20. The improved flow is a result of the relatively straight lines of the valve body 24. The bonnet 26 forms the top wall of the valve chamber 28, such that there is virtually no cavity between the bonnet and the valve chamber, as contrasted with the existence of a cavity 16 in the prior art valve 10. The distance from the center-line 27 of the body 24 to the bottom of the bonnet 26 is approximately the same as the distance from the center-line to the bottom of the valve chamber.

Figure 3:
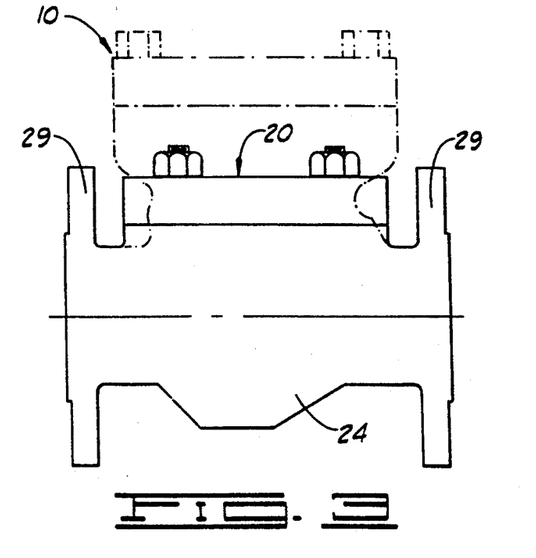
FIG. 3 is a side elevation of a top-entry check valve constructed in accordance with the present invention with a prior art top-entry check valve shown in outline to illustrate the improved dimensions of the present invention.

FIG. 3 is a comparison of a conventional, prior art top-entry check valve 10 (partially in outline) and a check valve 20 constructed in accordance with the present invention (shown in full lines). This comparison illustrates the reduction in size and weight accomplished by the present invention. The drawing also shows the use of flanges 29 at the upstream and downstream ends of the valve 20, although it will be understood that the valve body 24 can be fitted any desired connecting arrangement.

It will also be understood that the following embodiments include the use of standard seals, such as elastomeric O-ring seals, to provide fluid-tight engagement between various surfaces. Such seals are installed in a conventional manner where needed to prevent leakage of fluid between the valve components. These seals are omitted from the drawings in order to illustrate more clearly the preferred embodiments of the present invention.

Figure 4:
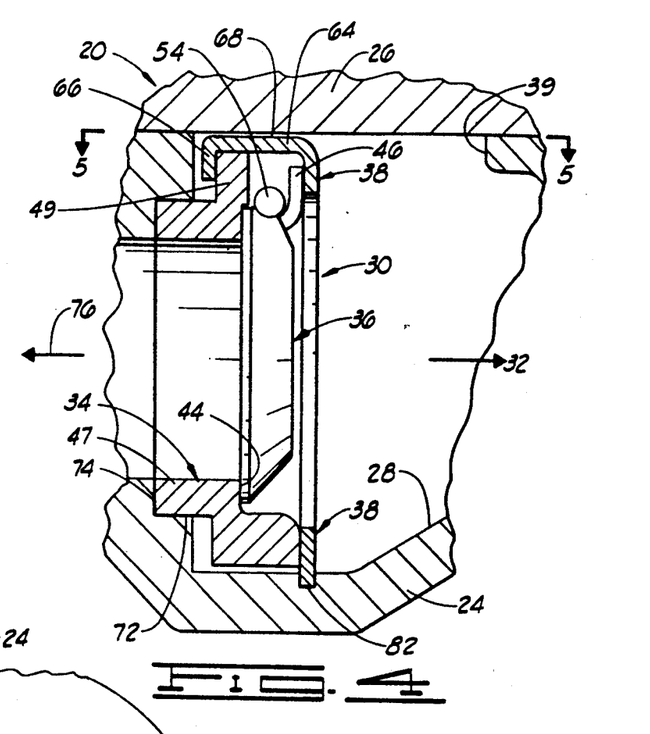
FIG. 4 is a vertical cross-sectional view of a portion of a top-entry check valve constructed in accordance with the present invention.
Figure 5:
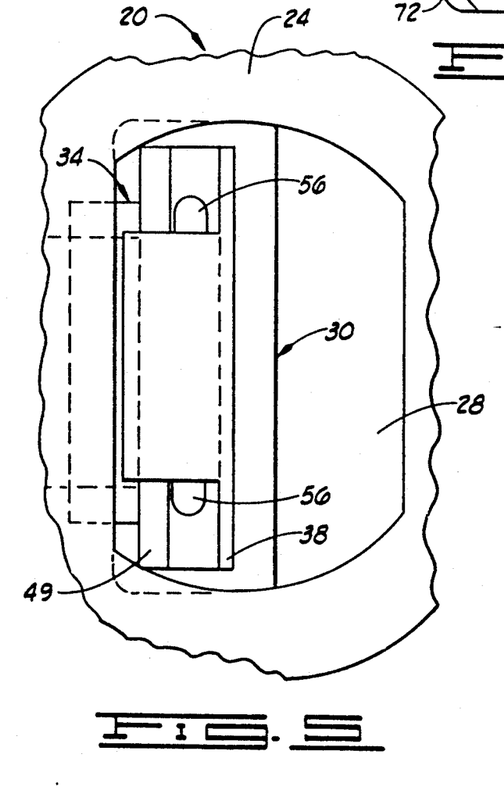
FIG. 5 is a cross-sectional view taken along lines 5—5 of FIG. 4.

Embodiment of FIGS. 4 and 5

In FIGS. 4 and 5, the central portion of a valve 20A constructed in accordance with the present invention is shown enlarged. As shown in these figures, the valve chamber 28 receives a valve cartridge assembly, generally designated by reference character 30. The valve cartridge assembly 30 controls the flow of fluid through the valve 20. The valve cartridge assembly 30 basically comprises a unitary valve seat and cage member 34, a valve disc 36 supported on the member 34 and a retainer ring 38. As best shown in FIG. 5, an access opening 39 allows installation and removal of the valve cartridge assembly 30, when the bonnet 26 is detached from the valve body 24.

Figure 6:
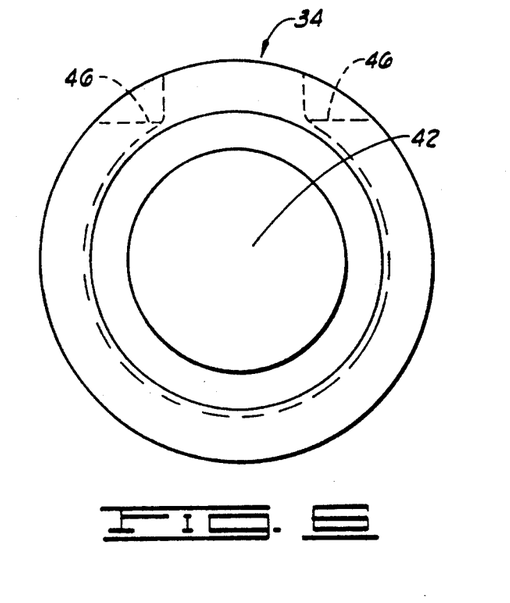
FIG. 6 is an elevational view of a unitary seat and cage of a valve of this invention from the upstream side.
Figure 7:
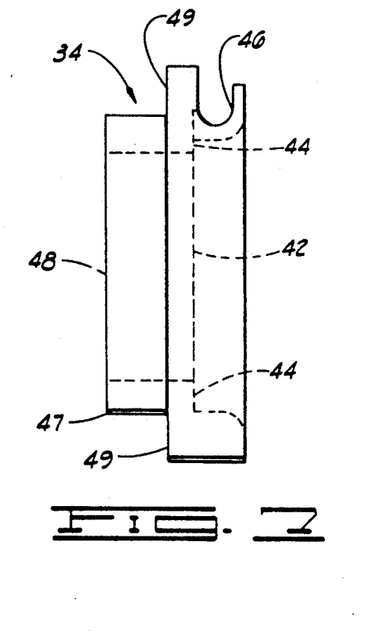
FIG. 7 is a side elevation of the unitary seat and cage of FIG. 6.
Figure 8:
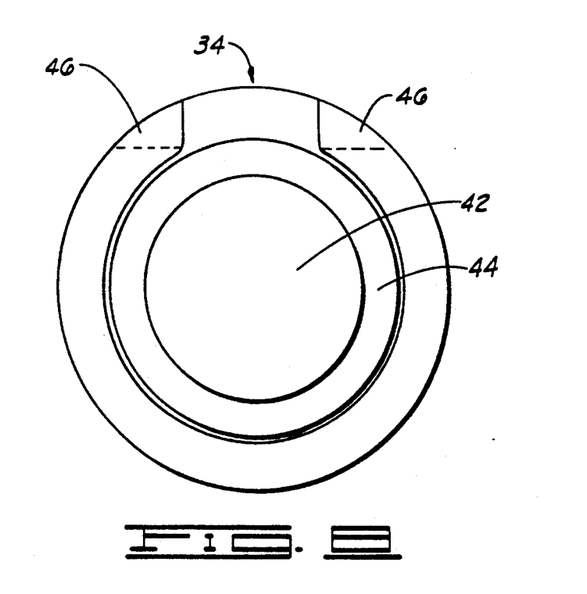
FIG. 8 is an elevational view of the unitary seat and cage of FIG. 6 from the downstream side.

Turning to FIGS. 6, 7 and 8, a unitary seat and cage 34 constructed in accordance with the present invention is now disclosed. The seat/cage 34 is generally circular with a flow opening 42 therethrough. An annular seating face 44 around the flow opening 42 is sized and shaped to mate with the disc 36. A pair of hinge pin supports 46 extend generally radially in the seat/cage 34 to suspend the disc 36 in the valve cartridge assembly 30. As best shown in FIG. 7, a reduced diameter extension 47 is formed in the upstream end 48 of the unitary seat and cage 34 and an annular shoulder 49 extends around the unitary seat and cage member 34. FIG. 7 also illustrates that the hinge pin supports 46 are generally U-shaped in cross-section.

Figure 9:
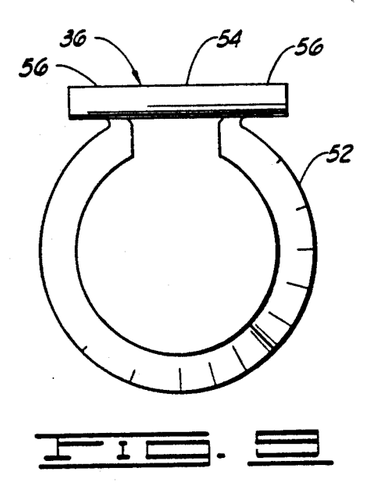
FIG. 9 is an elevational view of the disc of a valve of this invention from the downstream side.
Figure 10:
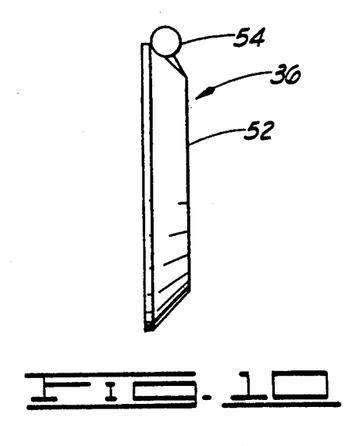
FIG. 10 is a side elevation of the disc of FIG. 9.
Figure 11:
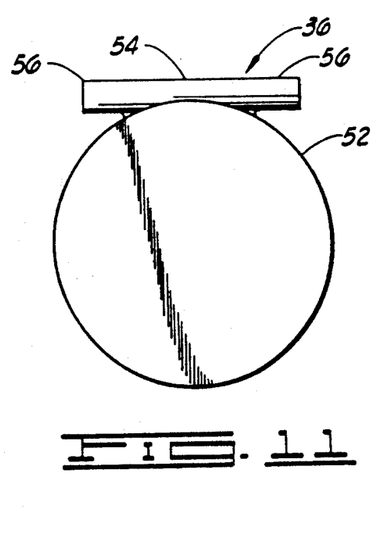
FIG. 11 is an elevational view of the disc of FIG. 9 from the upstream side.

Referring now to FIGS. 9 through 11, the disk 36 utilized in the top-entry check valve 20 of the present invention is disclosed. The disc 36 is a generally circular flat plate 52. At least one hinge pin 54, with end portions 56, extends at a tangent from the plate 52. As discussed hereinafter, the end portions 56 of the hinge pin 54 pivotally support the disc 36 within the valve 20.

Figure 12:
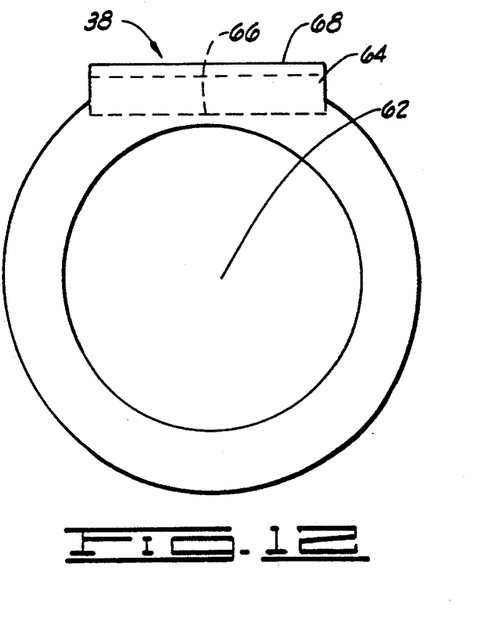
FIG. 12 is an elevational view of the retainer ring shown in FIGS. 4 and 5 from the downstream side.

Referring now to FIGS. 4, 5 and 12, a retainer ring 38 constructed in accordance with the present invention is disclosed. The retainer ring 38 is basically circular with a centrally located flow opening 62. As best shown in FIG. 4, an extension 64 protrudes from the outer periphery of the retainer ring 38. The extension 64 is bent over to form a lip 66 such that the cross-section of the retainer ring 38 and extension 64 forms three sides of a rectangle. The upper surface 68 of the extension 64 is flat and extends over a medial portion of the retainer ring 38.

Referring back to FIGS. 4 and 5, the installation of the valve cartridge assembly 30 in the valve chamber 28 is now disclosed in detail. As described hereinabove, the valve cartridge assembly 30 comprises a unitary seat and cage member 34, a valve disc 36 and a retainer ring 38. The upstream end portion 48 of the unitary seat and cage member 34 has a reduced diameter extension 47 which fits into a mating counterbore 72 forming an annular shoulder 74 facing downstream to mate with the upstream end 48 of the valve of the member 34. The mating counterbore 72 with annular shoulder 74 engages the upstream end 48 of the unitary seat and cage member 34 to prevent movement of the valve cartridge assembly 30 in the upstream direction indicated by arrow 76.

As best illustrated by FIG. 4, the hinge pin supports of the unitary seat and cage member 34 cradle the hinge pin 54 of the disc 36 to suspend the disc 36 within the valve cartridge assembly 30. The disc 36 pivots about the axis of the hinge pin 54 to close against the seating face 44 of the unitary seat and cage member 34 and prevent flow through the valve cartridge assembly 30 in the upstream direction 76. Conversely, the disc 36 pivots about the axis of the hinge pin 54 to open away from the seating face 44 of the unitary seat and cage 34 and allow unobstructed flow through the valve cartridge assembly 30 in the downstream direction 32.

Continuing to refer to FIG. 4, the retainer ring 38 is installed at the downstream end of the unitary seat and cage member 34. A transverse groove 82 is formed in the inside of the valve body 24 opposite the bonnet 26 to receive the retainer ring 38. The retainer ring 38 matingly fits in the transverse groove 82 and engages the downstream end of the unitary seat and cage member 34 to prevent downstream movement of the valve cartridge assembly 30.

As illustrated in FIGS. 4 and 5, the extension 64 of the retainer ring 38 matingly engages the top and the upstream side of the annular shoulder 49 of the unitary seat and cage member 34. The bonnet 26 abuts the flat upper surface 68 of the extension 64 and prevents the retainer ring 38 from rotating within the valve chamber 28 and from being dislodged from the transverse groove 82.

The retainer ring 38 and the extension 64 of the retainer ring 38 cooperate with the hinge pin supports 46 and the annular shoulder 49 to trap the hinge pin 54 of the disc 36 within the hinge pin supports 46. The hinge pin supports 46 are larger than the diameter of the hinge pin 34 and allow the disc 36 to float in the upstream 76 and downstream 32 directions in a near-closed position. This "float" of the disc 36 prevents damage and wear on the hinge 34, hinge pin supports 46 and disc 36 by lessening the pressure of sudden flow changes.

Embodiment of FIGS. 13, 14, 15 and 16

Figure 13:
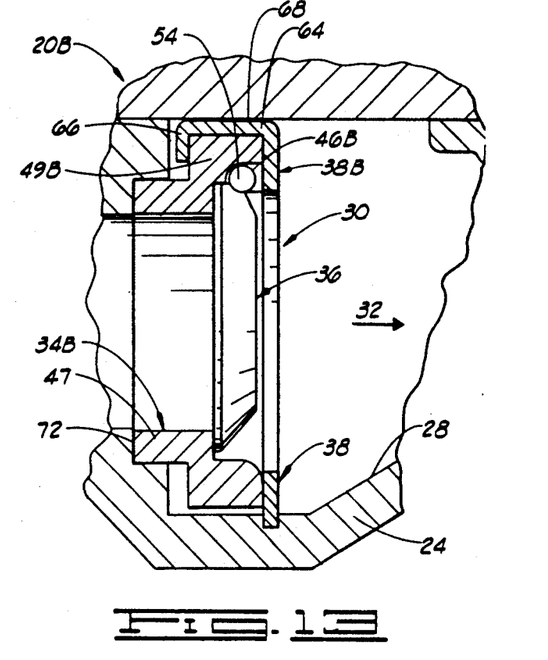
FIG. 13 is a vertical cross-sectional view of another form of top-entry check valve constructed in accordance with the present invention.

Referring now to FIG. 13, reference character 20B designates another form of a valve constructed in accordance with the present invention. The unitary seat and cage member 34B is modified with respect to the annular shoulder 49B and hinge pin supports 46B.

Figure 14:
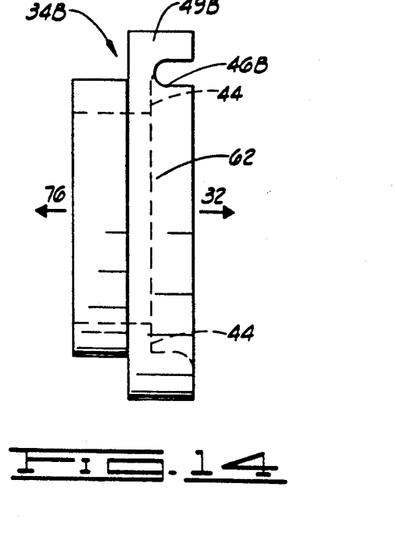
FIG. 14 is a side elevation of the unitary seat and cage of FIG. 13.
Figure 15:
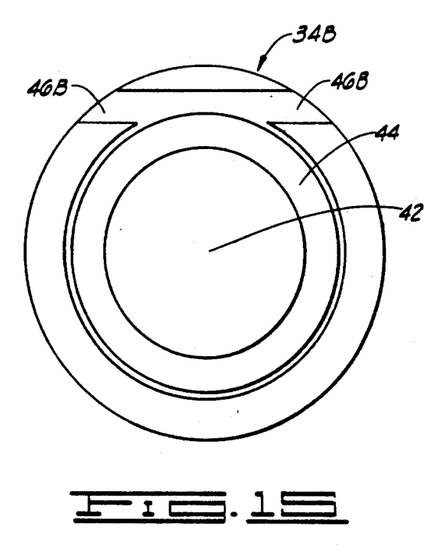
FIG. 15 is an elevational view of the unitary seat and cage of FIG. 13 from the downstream side.

As shown in FIGS. 13 and 14, the upper portion of the annular shoulder 49B extends toward the downstream side of the unitary seat and cage member 34B to form U-shaped hinge pin supports 46B which face in the downstream direction 32. FIG. 15 further depicts the modified member 34B and the flow opening 42, seating face 44 and hinge pin supports 46B.

Figure 16:
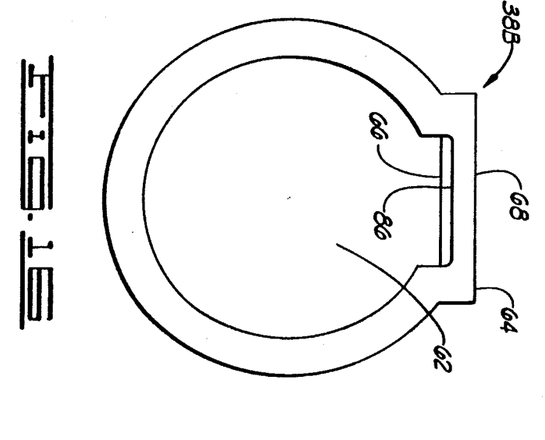
FIG. 16 is an elevational view of the retainer ring of FIG. 13 from the downstream side.

FIG. 13 illustrates a salient feature of the valve 20B. The retainer ring 38B extends over the hinge pin supports 46B of the unitary seat and cage member 34B to trap the hinge pin 54 of the disc within the hinge pin supports 46B. FIG. 16 shows a relief area 86 formed in the retainer ring 38B. The relief area 86 is necessary so that the retainer ring 38B may extend over the hinge pin supports 46B without interfering with the pivot movement of the disc 36.

Embodiment of FIGS. 17, 18, 19, 20 and 21

Figures 17, 18, 19:
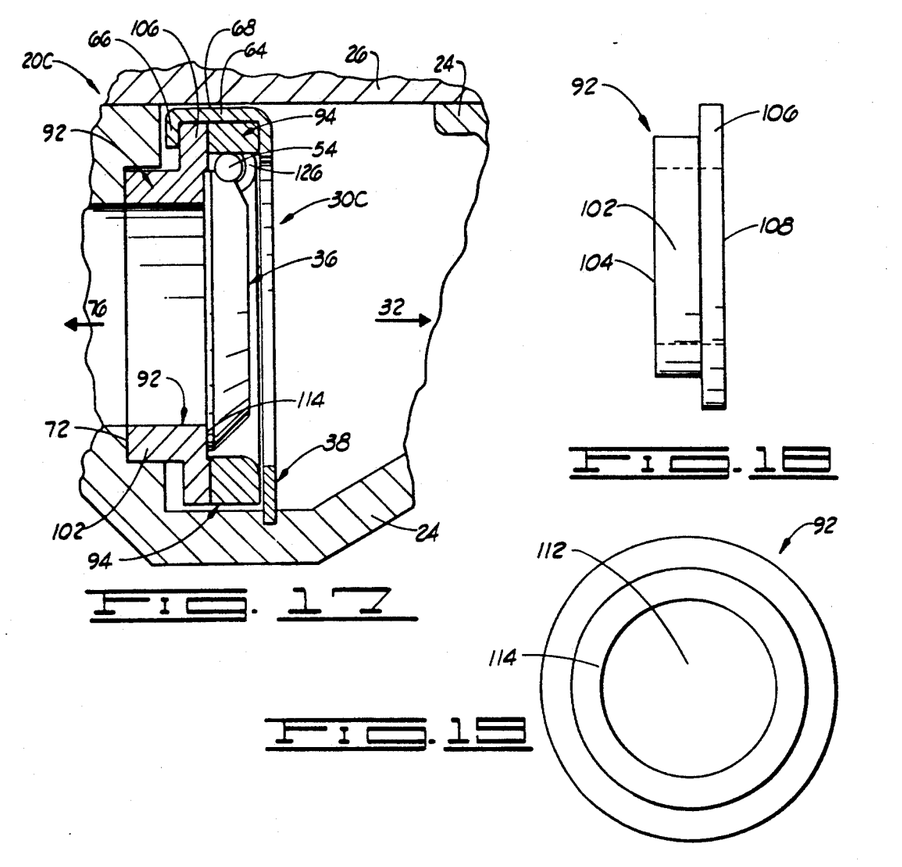
FIG. 17 is a vertical cross-sectional view of another form of top-entry check valve constructed in accordance with the present invention.
FIG. 18 is a side elevation of the separate valve seat of FIG. 17.
FIG. 19 is an elevation of the separate valve seat of FIG. 17 from the upstream side.

Referring to FIG. 17, yet another preferred embodiment of the present invention is designated by reference character 20C. In this particular embodiment, a separate seat 92 and cage 94 are used rather than the unitary seat and cage member 34 utilized in the embodiments described hereinabove.

As shown in FIG. 18, the separate seat 92 comprises a reduced diameter portion 102 at the upstream end and an annular shoulder 104 at the downstream end. FIG. 19 illustrates the circular shape of the separate seat 92, the flow opening 112 through the seat 92, and the seating face 114 of the seat 92. The seating face 114 is sized and shaped to matingly receive the disc 36.

Figure 20:
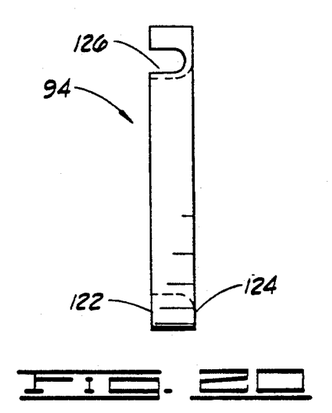
FIG. 20 is a side elevation of the separate valve cage of FIG. 17.
Figure 21:
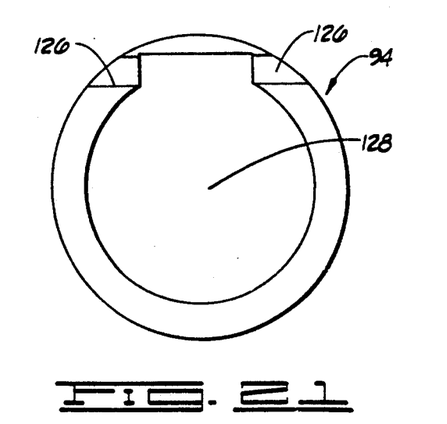
FIG. 21 is an elevation of a separate valve cage of FIG. 17 from the upstream side.

FIGS. 21 and 22 illustrate the structure of the separate cage 94. As shown in FIG. 20, the cage 94 has an upstream side 122, a downstream side 124 and U-shaped hinge pin supports 126 which face upstream. FIG. 21 illustrates the circular shape of the cage 94, the flow opening 128 through the cage 94, and the hinge pin supports 126.

Referring back to FIG. 17, it will be seen that the installation of the valve 20C is similar to that of previously disclosed embodiments. The extension 64 of the retainer ring 38, however, engages both the cage 94 and the annular shoulder 104 of the seat 92. The hinge pin 54 of the disc 36 is trapped within the hinge pin supports 126 of the cage 94 by the downstream side of the annular shoulder 106 of the seat 92.

Embodiment of FIGS. 22, 23, 24 and 25

Figure 22:
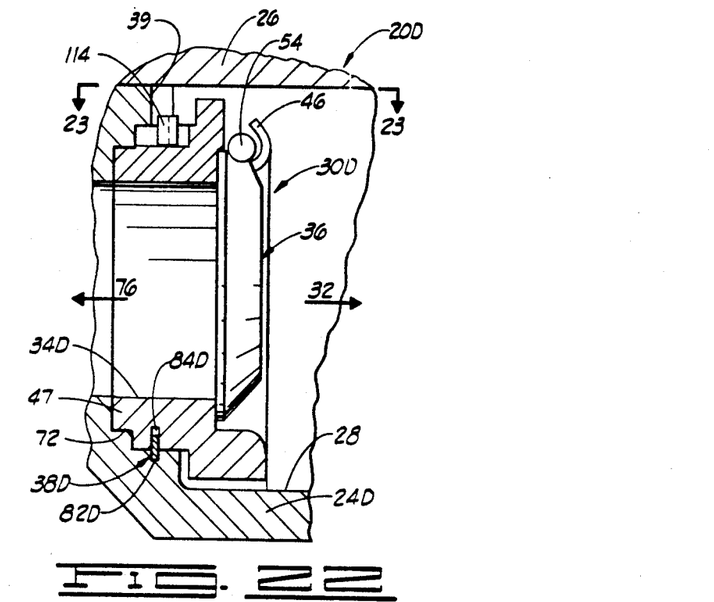
FIG. 22 is a vertical cross-sectional view of yet another top-entry check valve constructed in accordance with the present invention.

FIG. 22 illustrates yet another valve 20D constructed in accordance with the present invention. This particular embodiment utilizes a modified unitary seat and cage member 34D and a split ring 38D for a retainer ring.

As shown in FIG. 22, a transverse groove 84D is formed in the bottom outer surface of the unitary seat and cage member 34D. The transverse groove 84D is sized and shaped to receive the split ring 38D and completely circumscribes the unitary seat and cage member 34D.

Figure 23:
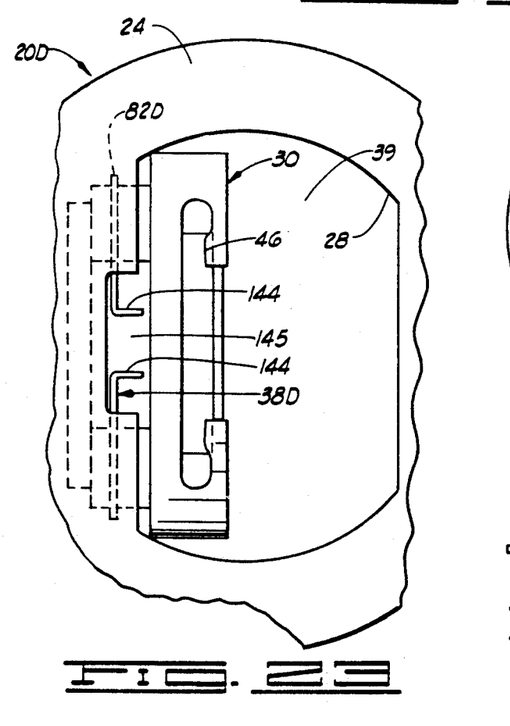
FIG. 23 is a cross-section of the valve body taken along lines 23–23 of FIG. 22.
Figure 24:
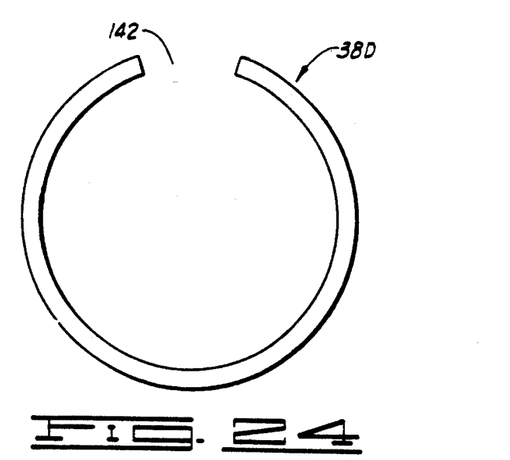
FIG. 24 is an elevation of the split retainer ring of FIGS. 22 and 23
Figure 25:
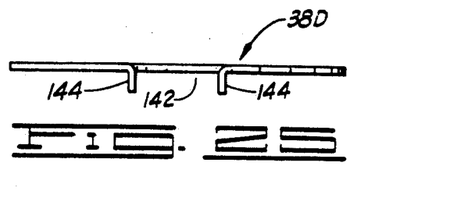
FIG. 25 is top view of the split retainer ring of FIG. 24 illustrating the tabs of the retainer ring.

Turning to FIGS. 23, 24 and 25, the construction of the split ring 38D is now disclosed. As shown in FIG. 23, the split ring 38D is designed to fit into a transverse groove 82D extending for 360 degrees in the inside surface of the valve body 24. FIG. 24 illustrates the circular shape of the split ring 38D and the split area 142 of the ring 38D. As best shown in FIGS. 23 and 25, the split ring 38D is bent at each side of the split area 142 to form tabs 144. The purpose of the tabs 144 is fully described below.

Referring back to FIG. 22, the installation of the valve cartridge assembly 30 including split ring 38D in the valve body 24 is now disclosed. The inner bottom surface of the valve body 24 has a transverse groove 82D sized and shaped to receive the split ring 38D. It is important to note that the groove 84D in the unitary seat and cage member 34D aligns with the groove 82D in the valve body 24 when the valve cartridge assembly 30 is properly installed in the valve body 24. Note that the depth of the grooves 82D and 84D and the size of the split ring 38D are such that a portion of the split ring 38D extends into both of the grooves 82D and 84D. The extension of the split ring 38D into both grooves 82D and 84D holds the unitary seat and cage member 34D in place and prevents movement of the valve cartridge assembly 30 in the downstream direction 32.

FIG. 23 illustrates the split ring 38D in the groove 82D of the valve body 24 (in outline) and the accessibility of the tabs 144 of the split ring 38D through the access opening 39. As shown in FIG. 22, the split ring 38D is sized and biased to fill the groove 82D in the valve body 24 while partially filling the groove 84D in the unitary seat and cage member 34D. The split ring 38D can be released from the groove 82D in the valve body 24 by squeezing the tabs 144 of the split ring 38D together. Squeezing the tabs 144 of the split ring 38D together pulls the split ring 38D completely out of the groove 82D of the valve body 24 and into the groove 84D of the unitary seat and cage member 34D. With the split ring 38D fully withdrawn from the groove 82D in the valve body 24, the valve cartridge assembly 30 can be freely removed from the valve body 24 through the access opening 39. Reversing this process allows installation of the valve cartridge assembly 30 into the valve body 24.

As shown in FIG. 22, the grooves 82D and 84D and the split ring 38D are upstream from the disc. There is no structure of the valve cartridge assembly 30 in the valve 30D, therefore, on the downstream side of the disc 36 which can trap the hinge pin 54 of the disc 36 within the hinge pin supports 46 of the unitary seat and cage member 34D. Accordingly, the hinge pin supports 46 of the unitary seat and cage member 34D are bent over to trap the hinge pin 54 of the disc 36 within the hinge pin supports 46.

Figure 26:
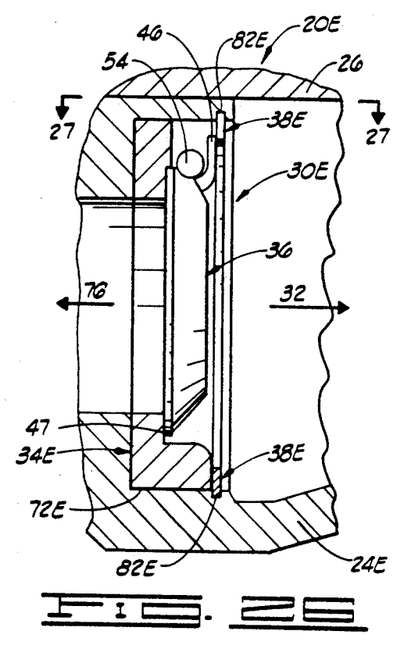
FIG. 26 is a vertical cross-sectional view of another form of top-entry check valve constructed in accordance with the present invention.
Figure 27:
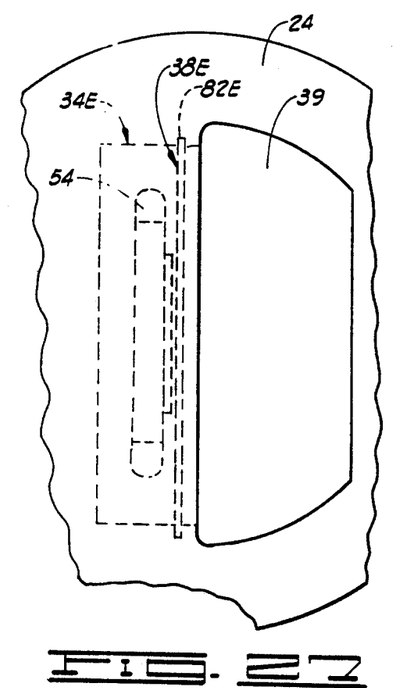
FIG. 27 is a cross-section of the valve body along lines 27—27 of FIG. 26.
Figure 28:
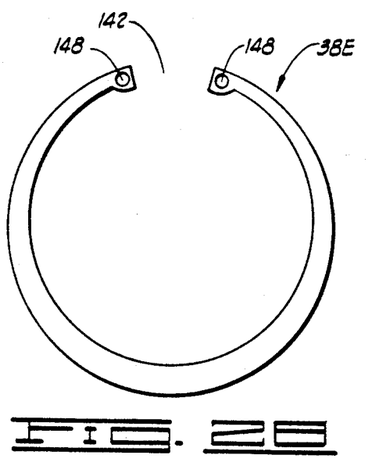
FIG. 28 is an elevation of the slotted split retainer ring used in the valve shown in FIGS. 26 and 27.

Embodiment of FIGS. 26, 27 and 28

FIG. 26 illustrates still another valve 20E constructed in accordance with the present invention. In this particular embodiment of the invention, the transverse groove 82E in the inner surface of the valve body 24 is located on the downstream side of the valve cartridge assembly 30 and extends for 360 degrees. A modified split ring 38E is used to hold the valve cartridge assembly 30 in place.

As shown in FIG. 28, the split ring 38E is circular in shape with a split area 142. A slot 148 is formed in the split ring 38E at each side of the split area 142. The purpose of the slots 148 in the split ring 38E will become apparent in the discussion below.

As illustrated in FIGS. 26 and 27, the groove 82E and the split ring 38E are constructed such that the split ring 38E fits into the groove 82E. As best shown in FIG. 26, the split ring 38E is sized and normally biased to fill the groove 82E and extend from the groove 82E. The extending portion of the split ring 38E engages the downstream side of the unitary seat and cage member 34 to prevent movement of the valve cartridge assembly 30 in the downstream direction 32.

As FIGS. 26 and 27 show, the split ring 38E is accessible through the access opening 39 even though the split ring 38E is not directly exposed in a top view of the access opening 39 (as indicated by the split ring 38E in outline form in FIG. 26). With the bonnet 26 removed, a tong-like tool (not shown) can be inserted through the access opening 39 to squeeze the slots 148 of the split ring 38E together. When the slots 148 of the split ring 38E are squeezed together, the split ring 38E is withdrawn from the groove 82E in the valve body 24 and the valve cartridge assembly 30 can be removed from the valve body 24 through the access opening 39. The valve cartridge assembly 30 and split ring 38E can be installed in the valve body 24 by reversing the removal process.

Referring now to FIG. 26, it is important to note that the split ring 38E extends from the groove 82E far enough to trap the hinge pin 54 of the disc 36 in the hinge pin supports 46 of the unitary seat and cage member 34. Note also that the entire valve cartridge assembly 30 is contained within the mating counterbore 72 of the valve body 24.

Figure 29:
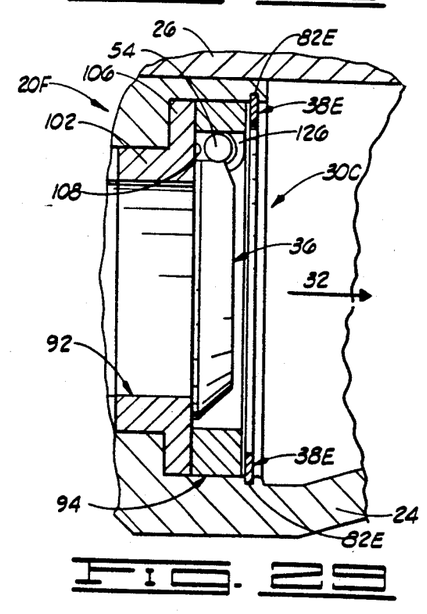
FIG. 29 is a vertical cross-sectional view of still another form of top-entry check valve constructed in accordance with the present invention.

Embodiment of FIG. 29

FIG. 29 illustrates another valve 20F constructed in accordance with the present invention. This particular embodiment of the invention is identical to valve 20E except that valve 20F uses the separate seat 92 and cage 94 arrangement rather than the unitary seat and cage member 34.

Note that the split ring 38E engages the downstream side of the separate cage 94 to prevent movement of the valve cartridge assembly 30 in the downstream direction 32. The downstream side 108 of the separate seat 92 traps the hinge pin 54 of the disc 36 within the hinge pin supports 126 of the cage 94 as has been described hereinabove.

Changes may be made in the combinations, operations and arrangements of the various parts and elements described herein without departing from the spirit and scope of the invention as defined in the following claims.

What is claimed is:

1. A top entry check valve, comprising:
   a valve cartridge assembly, including a seat, cage and disc, the disc being a generally circular flat plate having at least one hinge pin thereon extending along a tangent to the flat plate, the seat having an annular seating face sized to mate with the disc, and the cage having a pair of hinge pin supports receiving opposite end portions of the hinge pin, the hinge pin supports suspending the disc for swinging movement toward and away from the seat;
   a body having upstream and downstream ends, a valve chamber therein communicating with the upstream and downstream ends thereof, and an access opening in a side wall thereof communicating with the valve chamber of a size to accommodate the entry and removal of the valve cartridge therethrough, said body also having an annular shoulder therein facing downstream sized to engage and prevent the valve cartridge from moving upstream and a transverse groove therein extending at least partially across the valve chamber in spaced relation from said shoulder;
   a bonnet removably attached to the body over said access opening forming a wall of the valve chamber; and
   a retainer ring in the body fitting into said groove and engaging the valve cartridge assembly to hold the valve cartridge assembly against movement in a downstream direction in the valve chamber.

2. A valve as defined in claim 1 wherein the seat and cage comprise a unitary structure.

3. A valve as defined in claim 2 wherein each hinge pin support faces radially with respect to the disc, and wherein the retainer ring has an extension thereon trapping the hinge pin in the hinge pin supports.

4. A valve as defined in claim 2 wherein each hinge pin support faces radially with respect to the disc, the unitary structure has an annular shoulder on the outer periphery thereof facing upstream and spaced from said seating face, and wherein the retainer ring has an extension thereon traversing the hinge pin supports trapping the hinge pin in the hinge pin supports and engaging said annular shoulder.

5. A valve as defined in claim 2 wherein each hinge pin support faces downstream, and wherein the retainer ring is positioned to trap the hinge pin in the hinge pin supports.

6. A valve as defined in claim 2 wherein each hinge pin support faces downstream, the unitary structure has an annular shoulder on the outer periphery thereof facing upstream and spaced from said seating face, the retainer ring is positioned to trap the hinge pin in the hinge pin supports and has an extension thereon engaging said annular shoulder.

7. A valve as defined in claim 2 wherein each hinge pin support is generally U-shaped in cross section.

8. A valve as defined in claim 2 wherein each hinge pin support is sized larger than the diameter of the hinge pin, whereby the disc can float in upstream and downstream directions in a near-closed position.

9. A valve as defined in claim 2 wherein at least a portion of the outer periphery of the unitary structure fits in a mating counterbore in the valve chamber.

10. A valve as defined in claim 9 wherein the transverse groove in the valve chamber extends through substantially 360 degrees and the retainer is in the form of a split ring.

11. A valve as defined in claim 10 wherein the retainer ring engages the downstream end of the unitary structure and the entire length of the unitary structure fits in the mating counterbore in the valve chamber.

12. A valve as defined in claim 9 wherein the groove in the valve chamber is formed in said counterbore, the opposite ends of the groove communicating with an opening in the counterbore exposed to said access opening, and the outer surface of the unitary structure has a groove therein mating with the groove in the counterbore.

13. A valve as defined in claim 12 wherein the retainer ring is split and has tabs on the ends thereof positioned in the opening in the counterbore.

14. A valve as defined in claim 9 wherein said hinge pin supports are generally U-shaped in cross-section and face radially with respect to the disc, and wherein one side of each hinge pin support is bent over a portion of the hinge pin to trap the hinge pin therein.

15. A valve as defined in claim 1 wherein each hinge pin support faces radially with respect to the disc, and wherein the retainer ring has an extension thereon trapping the hinge pin in the hinge pin supports.

16. A valve as defined in claim 1 wherein each hinge pin support faces radially with respect to the disc, the seat has an annular shoulder on the outer periphery thereof facing upstream, and wherein the retainer ring has an extension thereon traversing the hinge pin supports trapping the hinge pin in the hinge pin supports and engaging said annular shoulder.

17. A valve as defined in claim 1 wherein each hinge pin support faces downstream, and wherein the retainer ring is positioned to trap the hinge pin in the hinge pin supports.

18. A valve as defined in claim 1 wherein each hinge pin support faces downstream, the seat has an annular shoulder on the outer periphery thereof facing upstream, the retainer ring is positioned to trap the hinge pin in the hinge pin supports and has an extension thereon engaging said annular shoulder.

19. A valve as defined in claim 1 wherein each hinge pin support is generally U-shaped in cross-section.

20. A valve as defined in claim 1 wherein each hinge pin support is sized larger than the diameter of the hinge pin, whereby the disc can float in upstream and downstream directions in a near-closed position.

21. A valve as defined in claim 1 wherein at least a portion of the outer periphery of the seat fits in a mating counterbore in the valve chamber.

22. A valve as defined in claim 21 wherein the transverse groove in the valve chamber extends through substantially 360 degrees and the retainer is in the form of a split ring.

23. A valve as defined in claim 22 wherein the retainer ring engages the downstream end of the cage and the entire length of the cage fits in the mating counterbore in the valve chamber.

24. A valve as defined in claim 21 wherein said hinge pin supports are generally U-shaped in cross-section and face radially with respect to the disc, and wherein one side of each hinge pin support is bent over a portion of the hinge pin to trap the hinge pin therein.

* * * * *